United States Patent
Reuter et al.

(10) Patent No.: US 6,463,532 B1
(45) Date of Patent: Oct. 8, 2002

(54) SYSTEM AND METHOD FOR EFFECTUATING DISTRIBUTED CONSENSUS AMONG MEMBERS OF A PROCESSOR SET IN A MULTIPROCESSOR COMPUTING SYSTEM THROUGH THE USE OF SHARED STORAGE RESOURCES

(75) Inventors: James M. Reuter, Colorado Springs, CO (US); Leslie Lamport, Palo Alto, CA (US); Eliezer Gafni, Palo Alto, CA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/255,897

(22) Filed: Feb. 23, 1999

(51) Int. Cl.[7] .............................................. G06F 15/16
(52) U.S. Cl. ...................................... 713/110; 709/224
(58) Field of Search ................................. 709/248, 226, 709/229, 251; 711/148, 163, 150; 713/110, 100

(56) References Cited

U.S. PATENT DOCUMENTS

| | | | |
|---|---|---|---|
| 4,253,146 A | * 2/1981 | Bellamy et al. | 364/200 |
| 4,425,615 A | * 1/1984 | Swenson et al. | 364/200 |
| 5,434,970 A | * 7/1995 | Schiffleger | 395/200 |
| 5,553,267 A | * 9/1996 | Herlihy | 395/474 |
| 5,630,169 A | * 5/1997 | Jackson | 395/825 |
| 6,021,431 A | * 2/2000 | Girogio et al. | 709/217 |
| 6,173,378 B1 | * 1/2001 | Rozario et al. | 711/163 |
| 6,219,712 B1 | * 4/2001 | Mann et al. | 709/235 |
| 6,226,717 B1 | * 5/2001 | Reuter et al. | 711/147 |
| 6,301,639 B1 | * 10/2001 | Cleavinger et al. | 711/112 |

OTHER PUBLICATIONS

Lamport, Leslie; "The Part–Time Parliament", © 1998 ACM, pp. 1–32.
Lynch, Nancy and Shavit, Nir; "Timing–Based Mutual Exclusion", pp. 1–10.
Lamport, Leslie; "A Fast Mutual Exclusion Algorithm", *ACM Transactions on Computer Systems*, vol. 5 No. 1, Feb. 1987, pp. 1–11.

* cited by examiner

*Primary Examiner*—David Wiley
(74) *Attorney, Agent, or Firm*—William J. Kubida; Kent A. Lembke; Hogan & Hartson LLP (57) ABSTRACT

A system and method for effectuating distributed consensus among members of a processor set in a multiprocessor computing system that is effective even when only a single surviving processor is operational and is achieved through joint implementation of a virtual state machine utilizing a sequence of numbered input commands. System synchronization is achieved by having all of the processors agree on the sequence of input commands so that they execute the same virtual state machine. Input commands are numbered consecutively and the processors use a set of shared stores (e.g. disk drives) to communicate amongst themselves requests (i.e. ballots) for new state machine inputs (or commands) and state machine inputs that have already been chosen (i.e. committed commands). A consensus process is used to decide upon (or commit) each command and this consensus is achieved using a majority of known system stores rather than a majority of known processors. Consequently, when consensus is achieved, it then exists on the system stores (e.g. the disk drives) and not in the processors.

37 Claims, 5 Drawing Sheets

SYSTEM AND METHOD FOR EFFECTUATING DISTRIBUTED CONSENSUS AMONG MEMBERS OF A PROCESSOR SET IN A MULTIPROCESSOR COMPUTING SYSTEM THROUGH THE USE OF SHARED STORAGE RESOURCES

CROSS REFERENCE TO RELATED PATENT APPLICATIONS

The present invention is related to the subject matter disclosed in co-pending U.S. patent application Ser. No. 09/244,955 filed Feb. 4, 1999 for "System and Method for Exclusive Access to Shared Storage", assigned to Digital Equipment Corporation, assigned of the present invention, the disclosure of which is herein specifically incorporated by this reference.

BACKGROUND OF THE INVENTION

The present invention relates, in general, to the field of systems and methods for dynamic information storage or retrieval. More generally, the present invention relates to a system and method for effectuating distributed consensus utilizing shared storage resources and state coordination among members of a processor set in a multiprocessor environment.

A computer system generally includes at least one processor to perform computations and control components coupled to the computer system. Some computer systems include multiple processors that access shared resources within the computer system. For example, multiple processors may individually access a shared hard disk, a shared input/output ("I/O") channel, a shared peripheral or a shared memory space to perform a particular function. Furthermore, such multiprocessor systems may allow a processor to communicate with other processors within the computer system through access to shared resources. For example, it is common for a processor to store data intended for another processor in a shared memory location. Thereafter, the other processor can read the data from the shared memory location.

It is also common for multiple processors in a computer system to share a storage location, for example, in a database stored on a hard disk. Preferably, access to the shared storage location is coordinated to provide exclusive access to the shared storage location by any single processor. Otherwise, one processor may independently modify the contents of the shared storage location without notice to another processor accessing the shared storage location at approximately the same time. Such processors are termed "competing processors", in that they are competing for access to a shared storage location. A possible result of non-exclusive access to a shared storage location by competing processors is that corrupted or unintended data may be read or stored in the shared storage location by one of the processors.

The aforementioned co-pending patent application discloses a particularly efficacious system and method for providing exclusive access to shared storage that does not rely on advance knowledge of the set of processors potentially accessing the shared storage. Furthermore, it advantageously affords an exclusive access solution that accommodates competing processors without deadlock, accommodates the unpredictable timing properties of a shared storage subsystem and does not rely on the particular properties of any particular shared storage subsystem.

One technique for synchronizing distributed state among a set of processors is known as "distributed consensus". Functionally, each processor is viewed as a state machine and all processors initially start in the same state. An input to the state machine (i.e. a command) produces an output and a new state. If all the processors agree on the inputs to their state machines (i.e. a consensus), then all of the processors will have the same state. Certain distributed consensus techniques also allow for processors to fail and then catch up with the current state when they restart. One such published algorithm (a.k.a. the "Paxos" algorithm) suitable for a variety of distributed systems is described by Leslie Lamport in "The Part-Time Parliament", ACM Transactions in Computer Systems, Vol. 16, No. 2, May 1998, pages 133–169, the disclosure of which is herein specifically incorporated by this reference.

To date however, all such distributed consensus processes have utilized communication among the processors in the set in order to obtain consensus. An inherent deficiency of such techniques, is that they then require a majority of a known set of processors to participate in the consensus. If a majority of the processors are not available, the process fails to make forward progress. This is not desirable in those instances where processors are relatively expensive in terms of overall system cost and it is required that but a single surviving processor be able to continue to provide service.

SUMMARY OF THE INVENTION

The system and method of the present invention achieves distributed consensus among members of a processor set even when only a single processor is operating. This is achieved by having a collection of processors jointly implement a virtual state machine and wherein the state machine utilizes a sequence of numbered input commands. System synchronization is achieved by having all of the processors agree on the sequence of input commands so that they execute the same virtual state machine. Input commands are numbered consecutively and the processors use a set of shared stores (i.e. disk drives) to communicate amongst themselves requests (i.e. ballots) for new state machine inputs (or commands) and state machine inputs that have already been chosen (i.e. committed commands). A consensus process is used to decide upon (or commit) each command. Furthermore, this consensus is achieved using a majority of known stores rather than a majority of known processors. Therefore, when consensus is achieved, it then exists on the system stores (e. g. the disk drives) and not in the processors.

In a particular embodiment of the present invention disclosed herein, the process is implemented utilizing a known set of "consensus disks" comprising the shared stores. Each processor participating in distributed consensus has one disk block reserved to that processor on each consensus disk. An exemplary disk block may contain the following information: a) a list of the most recently committed commands; b) a ballot number; c) the command a processor is trying to commit; d) the processor's unique identification ("ID"); and e) any additional information needed to determine the current state of the virtual machine. Each processor also maintains a copy of its current state, and this state may be in the same form as that of the disk blocks.

The procedure for reserving one disk block for each processor on each consensus disk necessitates some means for reserving exclusive access to the disk long enough for a processor to reserve a block. This reservation is recorded in a "directory block" that assigns processor identification ("IDs") to disk blocks. To this end, known mutual exclusion algorithms may be utilized and the system and method for exclusive access to shared storage disclosed and claimed in the aforementioned patent application incorporated by reference herein, is one particularly efficacious technique.

As disclosed in greater detail herein, an exemplary distributed consensus process in accordance with the present invention requires each processor participating in the consensus algorithm to have a unique ID not shared by any other participating processor. This ID may, in some instances, be conveniently considered to be the low-order digit of all of its ballot numbers in order that ballot numbers issued by different processors are unique and totally ordered. Furthermore, since a processor must be able to read and write a majority of the known set of "consensus disks" in order to make forward progress with this process, each processor that desires to submit a numbered state machine input for consensus agreement (i.e. commit a numbered command) will implement the process.

A representative process for distributed consensus utilizing shared storage resources and state coordination among members of a processor set in a multiprocessor environment as disclosed herein may conveniently operate in two separate rounds. In a first round, a processor is allowed to set its ballot number to a value greater than or equal to its current ballot number. (Generally, the ballot number is chosen to be greater than the numbers of any other ballots in progress). At this point, the processor reads its own disk block on each consensus disk in order to obtain current knowledge of the virtual state machine execution and the ballots it has already issued. If the processor already has knowledge of this information, this step can be omitted.

The processor then writes its current information to its own disk block on each consensus disk and it then reads a directory of processor-to-disk-block assignments for the other processors participating in the process. This directory is also kept on disk and a mutual exclusion algorithm protects writes to this directory as previously described. The processor then reads the disk block for each other processor on each consensus disk in order to detect if another processor is attempting to commit a command. If the processor reads that another processor has already committed a command with this number, then the reading processor aborts the process and adopts the already committed command. If it reads that another processor has issued a higher-numbered ballot, or it reads that the processor itself has issued an equal or higher numbered ballot for the same command, it aborts its own ballot.

This first round completes when the processor has read the disk block of every processor in the directory from a majority of the consensus disks. When round 1 is complete, the processor chooses the command from the highest numbered ballot that was found while reading the disk blocks. If no command was found, the processor can attempt to submit its own command for balloting.

The second round begins with the processor writing its current information to its own disk block on each consensus disk. At this point, the processor then reads a directory of processor-to-disk-block assignments for the other processors participating in the algorithm. This directory is also kept on disk and the same mutual exclusion process may be used to protect writes to this directory. The processor then reads the disk block for each other processor on each consensus disk. If it reads that another processor has already committed a command with this number, then the reading processor aborts the process and adopts the already committed command. If it reads that another processor has issued a higher-numbered ballot for the same command, it aborts its own ballot.

This second round completes when the processor has read the disk block of every processor in the directory from a majority of the consensus disks. At this point, the processor moves the committed command to the list of most recently committed commands and then writes its current state to its disk block on each consensus disk.

The final read operation in each round essentially detects if another processor is attempting to commit a command with the same command number. If that were the case, the highest-numbered ballot would take precedence. However, a processor can begin the first round again with a higher ballot number.

Competing processors can thus prevent each other from committing a command. Utilization of a secondary process that causes one of the processors to back off and allow the other to commit would solve this problem. An exemplary process is referred to as the "weak leader election" in the aforementioned Paxos algorithm.

Particularly disclosed herein is a multiprocessor computer system for effectuating distributed consensus among two or more processors. The system comprises at least one shared storage device accessible by each of the processors, a directory block designated on the storage device indicative of each of the processors participating in said consensus and a reserved portion on the storage device corresponding to each of the processors designated in the directory block. The reserved portion includes a listing of the most recently committed commands, a number assigned by the processor to a requested command and an identification of the requested command. Each of the processors are operative to read the directory block and the reserved portion of the storage device for all of the processors participating in the consensus.

Also particularly disclosed herein is a method and computer program storage medium readable and executable by a computer for effectuating distributed consensus among two or more uniquely identifiable processors in a multiprocessor computing system incorporating at least one shared storage device. The method comprises the steps of incrementally assigning numbers to requested commands input by each of the processors, utilizing the shared storage device to communicate requested commands and previously committed commands among the processors and determining among the processors which of the requested and previously committed commands are to be executed by each of the processors based upon the assigned numbers.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A PREFERRED EMBODIMENT

Figure 1:
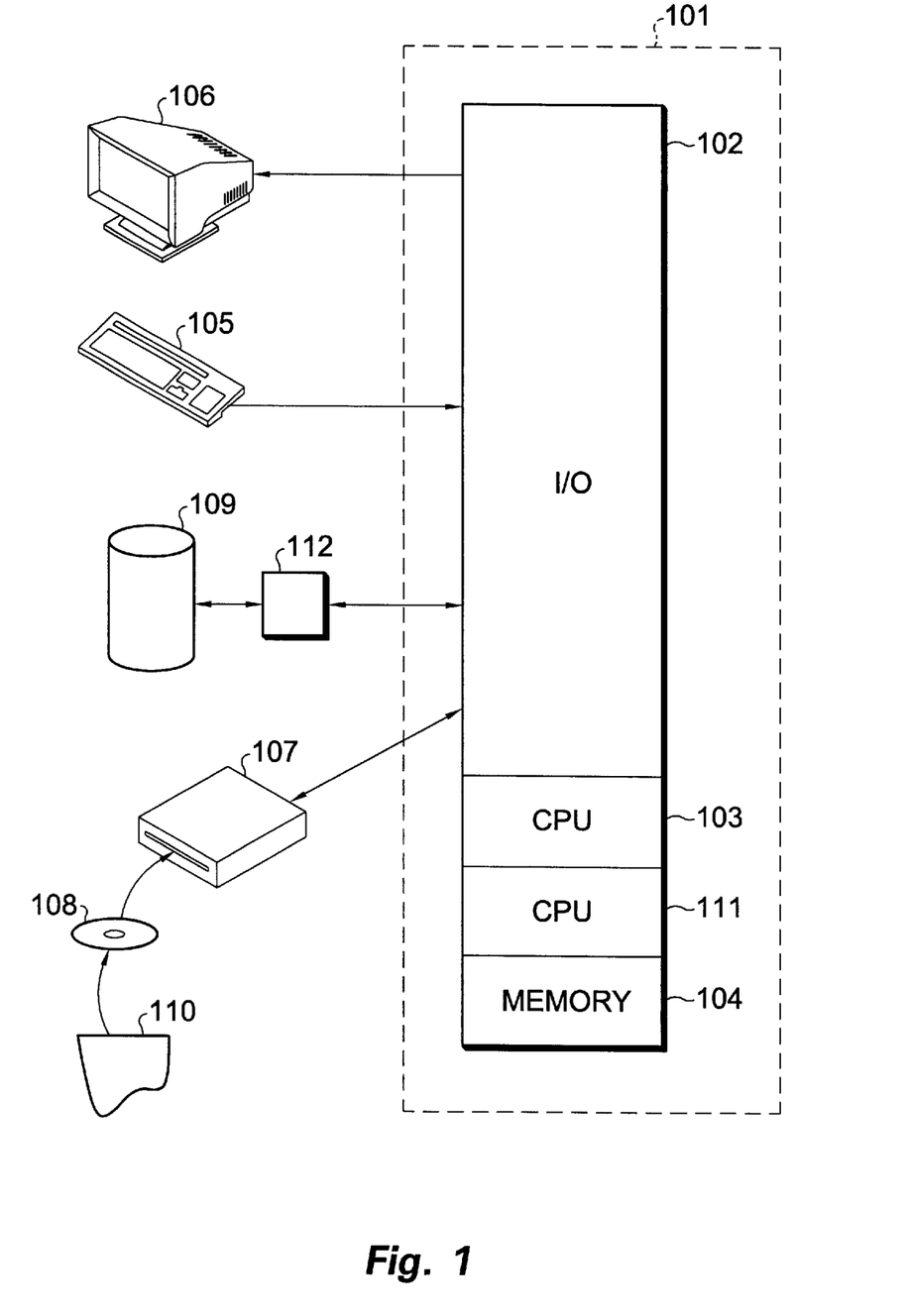
FIG. 1 depicts a general purpose computer in accordance with the present invention.

With reference now to FIG. 1, one representative operating environment in which the present invention is potentially useful encompasses the general purpose computer. In such a system, data and program files may be input to the computer, which reads the files and executes the programs therein. Some of the elements of a general purpose computer are shown wherein a processor subsystem 101 is shown having an input/output (I/O) section 102, Central Processing Unit ("CPU") 103, and a memory section 104. As illustrated, the processor subsystem 101 further includes an additional CPU 111, which may share access with CPU 103 to a storage location, such as in the memory section 104 and the storage unit 109. An embodiment of the present invention is preferably implemented in a controller chip or subsystem 112 for providing exclusive access to a shared storage location. In the illustrated embodiment, processors 103 and 111 are coupled through I/O section 102 to controller chip 112 to gain exclusive access to a shared storage location in storage unit 109. Alternately, a controller subsystem for providing exclusive access to a shared storage location may be incorporated into I/O section 102. Another alternate embodiment of the present invention is implemented in software devices loaded in memory 104 and/or stored on a configured CDROM 108 or storage unit 109 thereby transforming the computer system shown to a special purpose machine for implementing the present invention.

The I/O section 102 is connected to keyboard 105, display unit 106, disk storage unit 109, and disk drive unit 107. Generally, in contemporary systems, the disk drive unit 107 is a CDROM driver unit capable of reading the CDROM medium 108, that typically contains programs 110 and data. Computer program products containing mechanisms to effectuate the apparatus and methods in accordance with the present invention may reside in the memory section 104, on a disk storage unit 109, or on the CDROM medium 108 of such a system. Alternatively, disk drive unit 107 may be replaced or supplemented by a floppy drive unit, a tape drive unit, or other storage medium drive unit. Examples of such systems include VAX® and ALPHA® (registered trademarks of Digital Equipment Corporation) systems and personal computers offered by Compaq Computer Corporation, personal computers offered by other manufacturers, and other systems running a UNIX®-based or other computer operating system. In accordance with the present invention, software modules may be executed by processor 103, and shared storage may be implemented in disk storage unit 109, disk drive unit 107 or other storage medium units coupled to the system.

Figure 2:
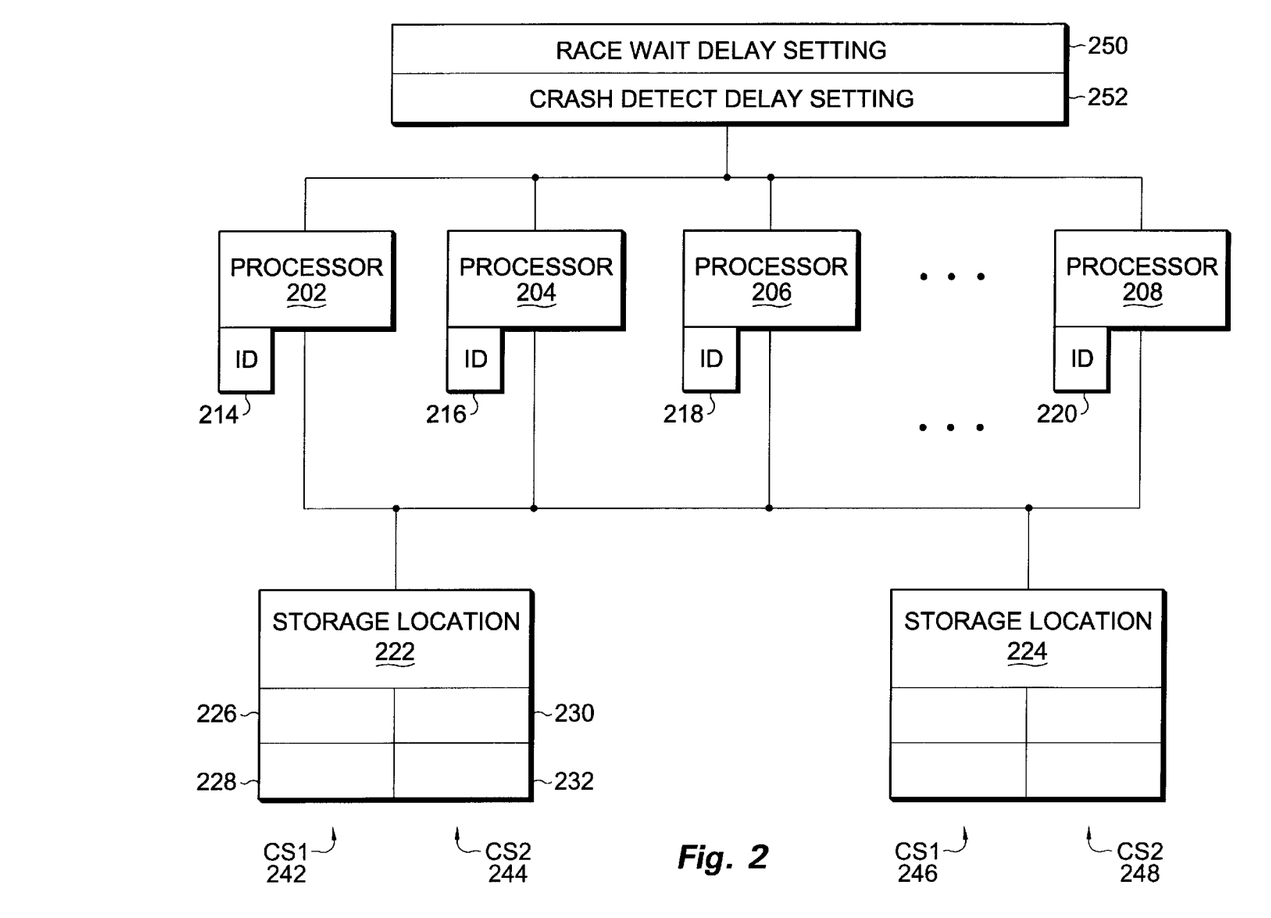
FIG. 2 depicts a block diagram of an exemplary system for providing exclusive access to a shared storage location in accordance with the present invention.

With reference additionally now to FIG. 2, a block diagram of an exemplary system for use with the present invention is shown in conjunction with the disclosure of the aforementioned co-pending patent application. Competing processors 202, 204, 206, and 208, as well as any additional competing processors (not shown, and together comprising a representative processor set) represent processors having coordinated access to shared storage location 222. Processor 202 is associated with processor identifier ("ID") 214, that uniquely identifies the processor from all other processors having access to, for example, a shared storage location 222. Likewise, processor 204 is associated with ID 216, processor 206 is associated with ID 218, and processor 208 is associated with ID 220. Any other processors having access to shared storage location 222 are also be associated with a unique identifier.

In an exemplary embodiment in accordance with the present invention, the set of processors is preferably dynamic. That is, the set of competing processors is not statically defined in advance. In contrast, processors may enter or leave the set of competing processors at any time. It is preferred that a processor entering the set of competing processors be uniquely identifiable (such as by a unique processor ID) within the set. Such unique identifiers may be reused to coordinate exclusive access to an alternate shared storage location 224 or an alternate set of identifiers (not shown) may be maintained for access to the alternate shared storage location 224.

A shared storage location may comprise a single unit of storage, a block of storage units, and multiple blocks of storage locally or remotely stored within the system. In an exemplary embodiment, the shared storage location comprises a magnetic disk drive. Each shared storage location is preferably associated with two "critical storage blocks". A critical storage block is a data structure such as a register, table, or other memory or storage device. The critical storage blocks, described in greater detail, are used to hold and maintain the state information related to the mutual exclusion ("mutex") lock.

The shared storage location 222 is associated with the critical storage block 1 ("CS1") 242 and the critical storage block 2 ("CS2") 244. The CS1 242 preferably comprises processor identifier ("ID") field 226 and counter field 228. Likewise, the CS2 244 preferably comprises processor ID field 230 and counter field 232. As shown, additional shared storage locations, such as shared storage location 224, are also associated with two critical storage blocks, for example, CS1 246 and CS2 248.

The critical storage blocks provide not only a means for storing state information to reserve the lock, but also a processor ID field that stores a unique processor ID or a "NotAProcessor code". The processor ID field enables any processor to detect not only that the critical storage block is reserved, but identifies a specific processor that has made the reservation. The NotAProcessor code is simply a predefined reserved code that is not associated with any processor in the set of competing processors. The NotAProcessor code may be stored in a critical section, in place of a unique processor ID, to indicate that the storage location is not reserved by any particular processor.

The critical storage block includes a counter field that stores a counter value to provides correctness in cases where a processor crashes and restarts the process. The counter value is incremented each time a specific processor reserves the critical storage block. For example, the first time the critical storage block is reserved the counter value may be set to binary "01". If that processor crashes and upon restarting attempts to reserve the critical section again, the counter is incremented to "10". In this manner, other processors will know that even though the first processor has held the lock for a time period longer than the crash detect delay (discussed below), that it has restarted. This prevents the other processors from seizing control of the lock by storing their own processor ID in the processor ID field while the first processor is in fact using the shared resource.

The CS1 and CS2 sections may be read from and written to by any processor in the shared set of competing processors according to a mutual exclusion protocol, preferably in accordance with the system and method for exclusive access to shared storage disclosed and claimed in the aforementioned co-pending patent application. By coordinating accesses to the CS1 242 and the CS2 244, a processor can establish an exclusive access reservation that can be detected and honored by other competing processors, without data corruption or unacceptable delays related to race conditions or processor crashes.

Figure 3:
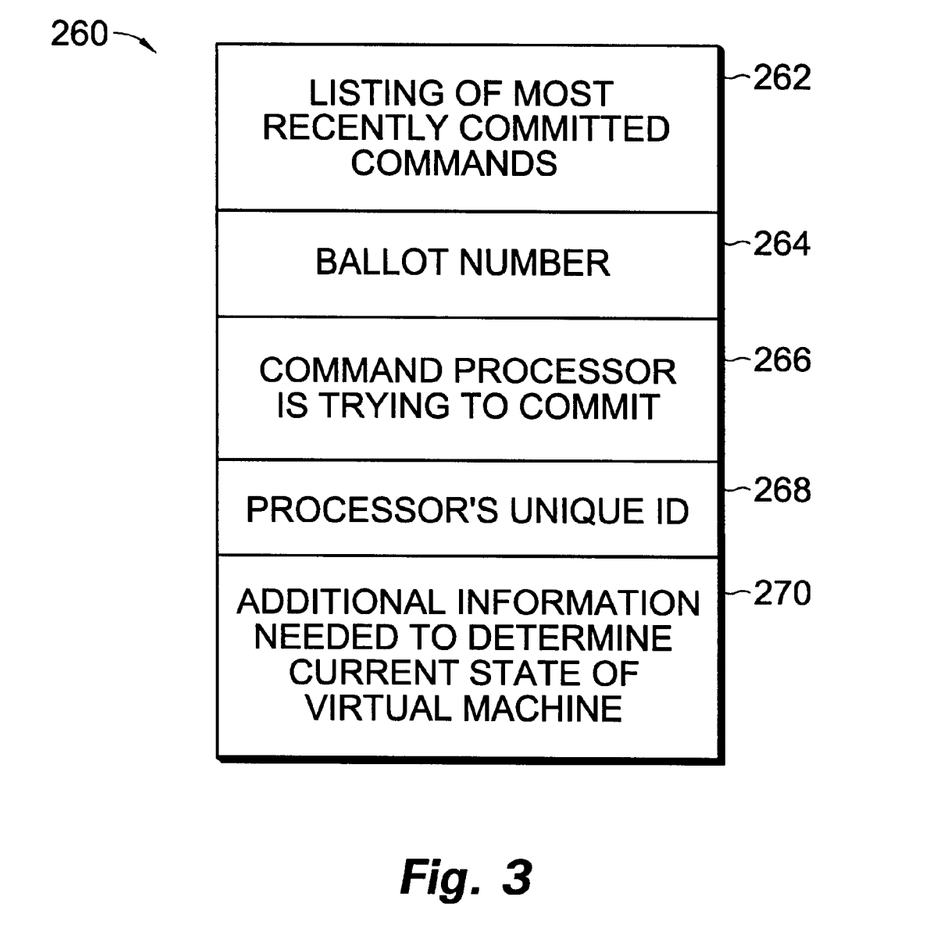
FIG. 3 is a simplified representational view of the contents of a reserved disk block associated with a given processor which may reside on each consensus disk.

In a particular embodiment, the programmable storage location 250 stores a "Race Wait Delay" value, and storage location 252 stores a Crash Detect Delay value. Preferably, each value is a time value or a clock cycle count. In this figure, the settings are exemplified as being stored in a single pair of storage locations; however, each processor may maintain their own copy of the Race Wait Delay and Crash Detect Delay settings. Preferably, each processor is associated with the same delay settings as every other processor that enters the set of competing processors, although delay settings for individual processors may be tuned in accordance with the present invention. The Race Wait Delay and Crash Detect Delay functionality is more fully described in the aforementioned co-pending patent application, With reference additionally now to FIG. 3, a representative disk block 260 associated with a given processor on each consensus disk is shown. The disk block 260 may comprise a listing 262 of the most recent committed commands, a ballot number portion 264, a portion 266 indicative of the command the processor is trying to commit, a portion 268 containing the processor's unique ID and a portion 270 which may contain any additional information needed to determine the current state of the virtual machine. As previously noted, each processor also maintains a copy of its own current state, and this state may be in the same form as that of the disk block 260.

Figure 4:
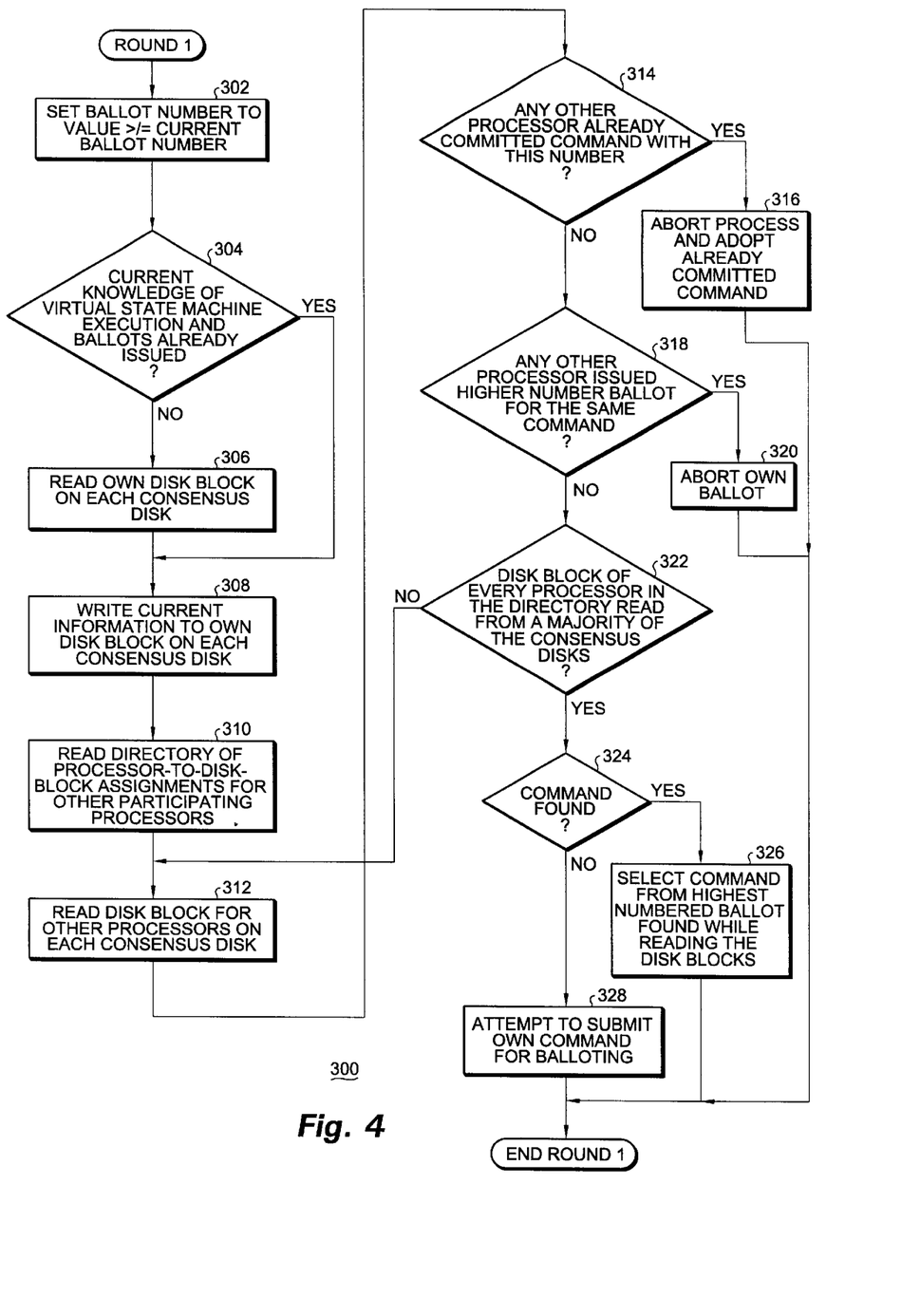
FIG. 4 is a logic flowchart of a representative process in accordance with the present invention illustrating the first round ("Round 1") of a two round process.

With reference additionally now to FIG. 4, a first portion of an exemplary process for effectuating distributed consensus utilizing shared storage resources and state coordination among members of a processor set (e.g. processors 202, 204, 206 and 208 of FIG. 2) in a multiprocessor environment is shown. The process may be implemented in two rounds, beginning with a Round 1 process 300. At the start of the process 300, a processor (e.g. one of the processors 202, 204, 206 or 208) is allowed to set its ballot number to a value greater than or equal to its current ballot number at step 302. Generally, the ballot number is chosen to be greater than the numbers of any other ballots in progress. If the processor does not already have current knowledge of the virtual state machine execution and those ballots already issued at decision step 304, the processor reads its own disk block 260 (FIG. 3) on each consensus disk at step 306. This is done in order to obtain current knowledge of the virtual state machine execution and the ballots it has already issued. However, if at decision step 304 the processor already has this information, the process 300 may then proceed to step 308 wherein the processor then writes its current information to its own disk block on each consensus disk.

At step 310, the processor reads a directory of processor-to-disk-block assignments for the other processors participating in the algorithm. This directory is also kept on disk and a mutual exclusion algorithm, for example as disclosed and claimed in the aforementioned co-pending patent application, protects writes to this directory. This read operation does not need to be protected.

At step 312, the processor then reads the disk block for each other processor on each consensus disk in order to determine if another processor is attempting to commit a command. If the processor determines that another processor has already committed a command with this number at decision step 314, then the reading processor aborts the process and adopts the already committed command at step 316. Alternatively, if the processor reads that another processor has issued a higher-numbered ballot for the same command at decision step 318, the reading processor aborts its own ballot at step 320

The Round 1 process 300 achieves completion when the processor has read the disk block of every processor in the directory from a majority of the consensus disks at decision step 322. If, at decision step 322, the disk block of every processor in the directory has not yet been read from a majority of the consensus disks, then the process 300 returns iteratively to 312 until such has been completed. At decision step 324, if a command has been found, the processor chooses the command from the highest numbered ballot that was found while reading the disk blocks at step 326. On the other hand, if no command was found at decision step 324, the processor can then attempt to submit its own command for balloting at step 328.

Figure 5:
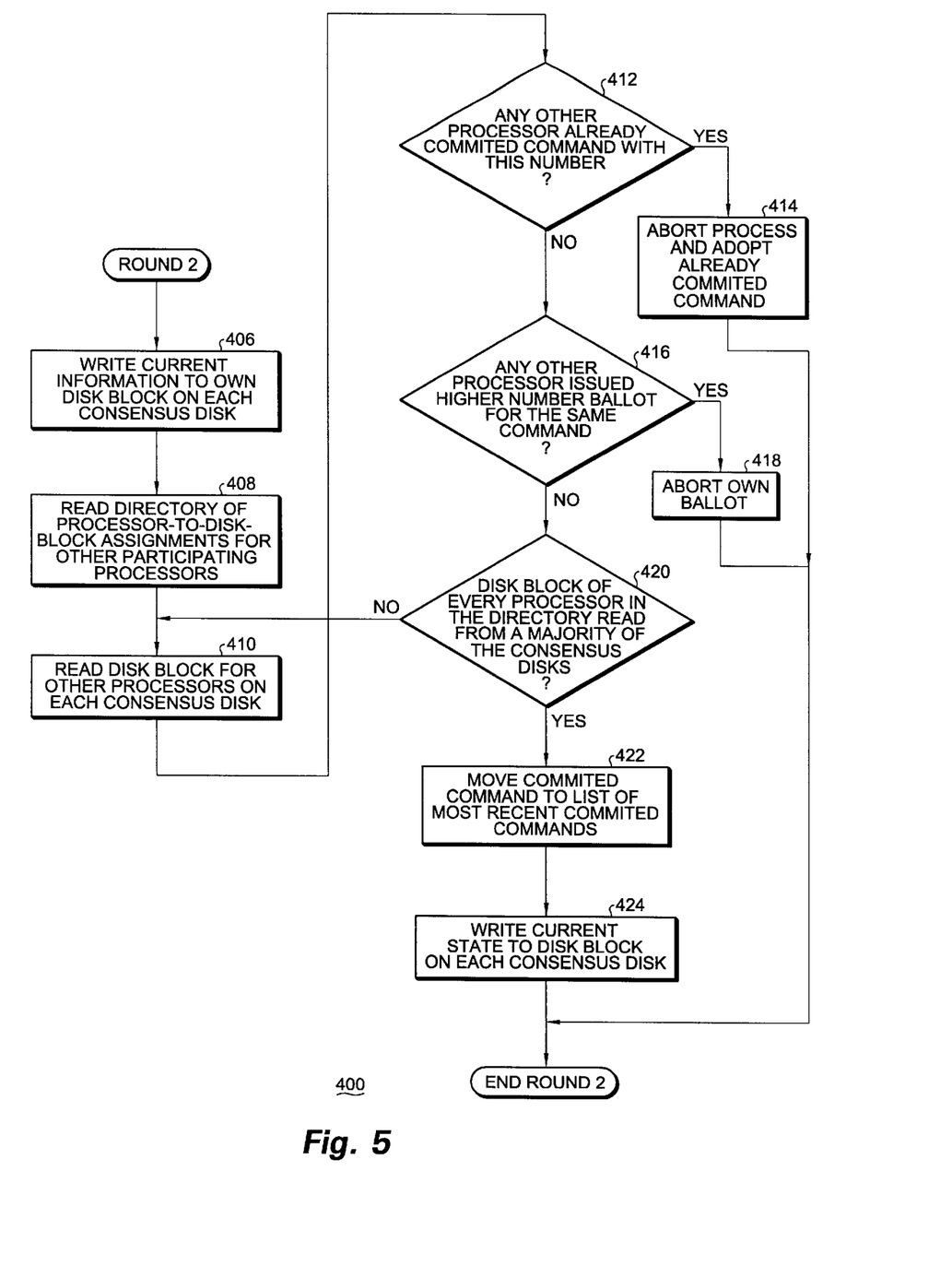
FIG. 5 is a logic flowchart of a follow-on representative process in accordance with the present invention illustrating the second round ("Round 2") of the two round process.

With reference additionally now to FIG. 5, a Round 2 process 400 is shown which follows the process 300 described and shown with respect to the preceding figure. The process 400 begins at step 406 where the processor writes its current information to its own disk block on each consensus disk.

At step 408, the processor then reads a directory of processor-to-disk-block assignments for the other processors participating in the process. This directory is also kept on disk and a mutual exclusion algorithm as previously described may be used to protect writes to this directory. Again, this read operation does not need to be protected. At step 410, the processor reads the disk block for each other processor on each consensus disk. If it reads that another processor has already committed a command with this number at decision step 412, the reading processor then aborts the process and adopts the already committed command at step 414. Otherwise, if it should determine that anther processor has issued a higher-numbered ballot for the same command at decision step 416, the reading processor aborts its own ballot at step 418.

At decision step 420, when the processor has read the disk block of every processor in the directory from a majority of the consensus disks, it then moves the committed command to the list of most recently committed commands at step 422 and then writes its current state to its disk block on each consensus disk at step 424. On the other hand, if the processor has not yet read the disk block of every processor in the directory from a majority of the consensus disks at decision step 420, the process 400 returns iteratively to step 410 until such has been completed. Functionally, the read operation effectively detects if another processor is attempting to commit a command with the same command number, in which case, the highest-numbered ballot takes precedence. In any event, a processor can begin the Round 1 process 300 (FIG. 4) again, submit a higher ballot number, and in this manner, competing processors can effectively prevent each other from committing a command. Utilizing a secondary process (such as the "weak leader election" process of the aforementioned Paxos algorithm) that causes one of the processors to back off and allow the other to commit will preclude this condition.

The distributed state of the system obtains any changes as soon as a given processor writes its committed command to a majority of the consensus disks. Despite the fact that in certain instances an arbitrary chosen processor may not yet be aware of that state change, it will nevertheless discover the state change when it attempts to commit a command of its own.

As can be appreciated, the system and method of the present invention does not require any knowledge of the contents of the commands being committed or the state machine being driven by these commands. These are specific to the distributed application being constructed using distributed consensus and the distributed consensus process of the present invention simply provides the distributed consensus or the inputs to the state machine. Further, the process disclosed herein solves the problem of providing distributed consensus to allow continued system operation even when only one processor is operating. Furthermore, the process does not depend on any timing constraints to maintain consistency and timing constraints are needed only by the weak leader election process to ensure progress.

Still further, the system and method of the present invention will function even when there is only one processor and a majority of the consensus disks surviving, therefore allowing the system to tolerate multiple system component failures. Failed consensus disks may be brought up to date when they are repaired and failed processors will ultimately gain knowledge of the most recently committed commands when they restart.

As previously mentioned, an important difference between the system and method of the present invention and that utilized in conventional approaches is that it depends on a majority of consensus disks to function rather than a majority of processors themselves. This renders it particularly suitable for storage subsystems and "clustered" systems that are relatively replete with disk storage and have comparatively few processors. Importantly, it allows even one surviving processor to provide continued system service.

In conjunction with the foregoing description of a preferred embodiment, the present invention has been described in terms of a particular application for multiple, distributed storage systems that are shared amongst a number of distributed processors. In particular, the present invention is especially useful in clustered systems wherein processors share disk storage and must coordinate use of that disk storage with minimal overhead and high reliability.

More generally however, the present invention is useful in any parallel and multithreaded processing environment that involves multiple processes or threads of execution that programmatically access and manipulate shared resources, including disk storage. Many of these shared resources can support access to only a single process at any given time. Although a data storage device can be used as an example, more generally any resource can be represented as an "object" that is accessed by an executing process or thread.

While there have been described above the principles of the present invention in conjunction with specific system configurations and processes, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A method for effectuating distributed consensus among two or more uniquely identifiable processors in a multiprocessor computing system incorporating at least one shared storage device comprising:

incrementally assigning numbers to requested commands input by each of said processors;

utilizing said shared storage device to communicate said requested commands and previously committed commands among said processors; and determining among said processors which of said requested commands and said previously committed commands are to be executed by each of said processors based upon said assigned numbers.

2. The method of claim 1 wherein said requested command and said previously committed commands are executable by a first one of said processors in the event a second one of said processors is unavailable.

3. The method of claim 1 wherein said step of incrementally assigning numbers to requested commands is carried out by the step of:

sequentially numbering said requested commands input by each of said processors.

4. The method of claim 1 wherein said step of incrementally assigning numbers to said requested commands comprises a portion of said numbers uniquely associated with each of said processors.

5. The method of claim 1 wherein said step of utilizing said shared storage device comprises the step of:

reserving at least a portion of said shared storage device to each of said processors.

6. The method of claim 5 wherein said state of reserving at least a portion of said share storage device further comprises the step of:

recording a correspondence between each of said processors and a reserved portion of said shared storage device in a directory block on said shared storage device.

7. The method of claim 5 wherein said step of utilizing said shared storage device further comprises the step of:

affording exclusive access to said shared storage device to one of said processors during said step of reserving.

8. The method of claim 6 wherein said step of determining comprises the steps of:

firstly reading said directory block of each other of said processors on said shared storage device; and secondly reading a contents of said reserved portion of said shared storage device in accordance with said directory block.

9. The method of claim 8 wherein said step of secondly reading comprises, for each of said uniquely identifiable processors referenced in said directory block, the steps of:

establishing a listing of most recently committed commands;

determining said assigned number for said requested commands; and identifying said requested commands.

10. The method of claim 9 wherein said step of determining further comprises the step of:
  adopting a previously committed command of another of said processors if said assigned number of said requested command is the same or higher.

11. The method of claim 10 further comprising the step of executing said adopted command.

12. The method of claim 9 wherein said step of determining further comprises the step of:
  submitting said requested command if no other previously committed command of another of said processors has an assigned number the same or higher.

13. The method of claim 12 further comprising the step of:
  adding said requested command to said listing of most recently committed commands in said reserved portion of said shared storage device.

14. The method of claim 13 further comprising the step of:
  writing a current state of said computing system to said reserved portion of each of said at least one shared storage devices.

15. A multiprocessor computer system for effectuating distributed consensus among two or more processors, said system comprising:
  at least one shared storage device, said storage device being accessible by each of said processors and being a persistent storage medium;
  a directory block designated on said storage device indicative of each of said processors participating in said consensus;
  a reserved portion on said storage device corresponding to each of said processors designated in said directory block, said reserved portion including a listing of most recently committed commands, a number assigned by said processor to a requested command, an identification of said requested command, and an additional portion for indicating a current state of said computer system, each of said processors being operative to read said directory block and said reserved portion of said storage device for each other of said processors participating in said consensus.

16. The multiprocessor computer system of claim 15 wherein said most recently committed commands and said requested commands of each of said processors are executable by a surviving one of said processors in the event all others of said processors are unavailable.

17. The multiprocessor computer system of claim 15 wherein said persistent storage medium comprises a magnetic disk drive.

18. The multiprocessor computer system of claim 15 wherein said at least one shared storage device comprises a multiplicity of shared storage devices, each of said shared storage devices comprising said directory block and said reserved portion.

19. The multiprocessor computer system of claim 15 wherein said reserved portion on said at least one shared storage device comprises:
  a listing of most recently committed commands;
  a ballot number portion;
  an attempted command commitment indicator portion; and
  a processor identification portion.

20. The multiprocessor computer system of claim 15 wherein each of said two or more processors maintains information relative to its own current state.

21. The multiprocessor computer system of claim 19 wherein each of said two or more processors maintains information relative to its own current state in a form corresponding to said reserved portion on said at least one shared storage device.

22. The multiprocessor computer system of claim 15 wherein additional storage devices accessible by each of said processors may be added to said system upon construction of a directory block indicative of each of said processors participating in said consensus and a reserved portion corresponding to each of said processors designated in said directory block.

23. The multiprocessor computer system of claim 15 wherein additional processors may be added to said system upon construction of a directory block indicative of each of said processors now participating in said consensus and a reserved portion corresponding to each of said processors designated in said directory block on each of said at least one shared storage devices.

24. A program storage medium readable by a computer, tangibly embodying a program of instructions executable by the computer for effectuating distributed consensus among two or more uniquely identifiable processors in a multiprocessor computing system incorporating at least one shared storage device, the program comprising instructions for:
  incrementally assigning numbers to requested commands input by each of said processors;
  utilizing said shared storage device to communicate said requested commands and previously committed commands among said processors; and
  determining among said processors which of said requested commands and said previously committed commands are to be executed by each of said processors based upon said assigned numbers.

25. The program storage medium of claim 24 wherein said requested command and said previously committed commands are executable by a first one of said processors in the event a second one of said processors is unavailable.

26. The program storage medium of claim 24 wherein said step of incrementally assigning numbers to requested commands is carried out by the step of:
  sequentially numbering said requested commands input by each of said processors.

27. The program storage medium of claim 24 wherein said step of incrementally assigning numbers to said requested commands comprises a portion of said numbers uniquely associated with each of said processors.

28. The program storage medium of claim 24 wherein said step of utilizing said shared storage device comprises the step of:
  reserving at least a portion of said shared storage device to each of said processors.

29. The program storage medium of claim 28 wherein said state of reserving at least a portion of said share storage device further comprises the step of:
  recording a correspondence between each of said processors and a reserved portion of said shared storage device in a directory block on said shared storage device.

30. The program storage medium of claim 28 wherein said step of utilizing said shared storage device further comprises the step of:
  affording exclusive access to said shared storage device to one of said processors during said step of reserving.

31. The program storage medium of claim 29 wherein said step of determining comprises the steps of:
  firstly reading said directory block of each other of said processors on said shared storage device; and secondly reading a contents of said reserved portion of said shared storage device in accordance with said directory block.

32. The program storage medium of claim 31 wherein said step of secondly reading comprises, for each of said uniquely identifiable processors referenced in said directory block, the steps of:

establishing a listing of most recently committed commands;

determining said assigned number for said requested commands; and identifying said requested commands.

33. The program storage medium of claim 32 wherein said step of determining further comprises the step of:

adopting a previously committed command of another of said processors if said assigned number of said requested command is the same or higher.

34. The method of claim 33 further comprising the step of executing said adopted command.

35. The method of claim 32 wherein said step of determining further comprises the step of:

submitting said requested command if no other previously committed command of another of said processors has an assigned number the same or higher.

36. The method of claim 35 further comprising the step of:

adding said requested command to said listing of most recently committed commands in said reserved portion of said shared storage device.

37. The method of claim 36 further comprising the step of:

writing a current state of said computing system to said reserved portion of each of said at least one shared storage devices.

* * * * *

UNITED STATES PATENT AND TRADEMARK OFFICE
CERTIFICATE OF CORRECTION

PATENT NO. : 6,463,532 B1
DATED : October 8, 2002
INVENTOR(S) : James M. Reuter, Leslie Lamport and Eliezer Gafni It is certified that error appears in the above-identified patent and that said Letters Patent is hereby corrected as shown below:

Columns 11-12,
Claim 21, should depend from Claim 15

Signed and Sealed this

Tenth Day of August, 2004

JON W. DUDAS
*Acting Director of the United States Patent and Trademark Office*